United States Patent [19]

Esterowitz et al.

[11] Patent Number: 4,965,803
[45] Date of Patent: Oct. 23, 1990

[54] ROOM-TEMPERATURE, LASER DIODE-PUMPED, Q-SWITCHED, 2 MICRON, THULIUM-DOPED, SOLID STATE LASER

[75] Inventors: Leon Esterowitz, Springfield; Robert C. Stoneman, Alexandria, both of Va.

[73] Assignee: The United Stats of America as represented by the Scretary of the Navy, Washington, D.C.

[21] Appl. No.: 501,461

[22] Filed: Mar. 30, 1990

[51] Int. Cl.$^5$ .............................................. H01S 3/30
[52] U.S. Cl. .......................................... 372/5; 372/12; 372/13; 372/39; 372/69; 372/72; 372/98; 372/41
[58] Field of Search ................... 372/5, 12, 13, 69, 71, 372/72, 41, 40, 39, 68, 98

[56] References Cited

U.S. PATENT DOCUMENTS

| | | | |
|---|---|---|---|
| 3,949,319 | 4/1976 | Tofield et al. | 372/71 |
| 3,972,007 | 7/1976 | Naiman et al. | 372/68 |
| 4,044,315 | 8/1977 | Snitzer | 372/40 |
| 4,321,559 | 3/1982 | Esterowitz et al. | 372/41 |
| 4,701,928 | 10/1987 | Fan | 372/68 |

OTHER PUBLICATIONS

Allen et al., "Diode-Pumped 2 μm Holmium Laser", Elect. Lett V. 22(1), p. 947, 23 May 1986.

Primary Examiner—Leon Scott, Jr.
Attorney, Agent, or Firm—Thomas E. McDonnell; George Jameson

[57] ABSTRACT

A room-temperature, laser-pumped, Q-switched, thulium-doped, solid state laser for producing pulses of laser emission at substantially 2 microns is disclosed. In a preferred embodiment, the laser comprises: a laser cavity defined by first and second reflective elements opposing each other on a common axis to form a reflective path therebetween; a laser crystal disposed in the laser cavity, the laser crystal having a host material doped with an amount of thulium activator ions sufficient to produce a laser emission at substantially 2 microns from the $^3F_4$ to $^3H_6$ laser transition in the thulium activator ions when the laser crystal is enabled and is pumped by a CW pump beam at a preselected wavelength; a pump laser for pumping the laser crystal with the CW pump beam at the preselected wavelength; and a Q-switch disposed in the laser cavity between the laser crystal and the second reflective element for periodically enabling the laser crystal to produce a pulsed laesr emission at substantially 2 microns when the laser crystal is also pumped by the CW pump beam.

20 Claims, 3 Drawing Sheets

ROOM-TEMPERATURE, LASER DIODE-PUMPED, Q-SWITCHED, 2 MICRON, THULIUM-DOPED, SOLID STATE LASER

CROSS-REFERENCE TO RELATED APPLICATION

This patent application is related to the co-pending U.S. patent application entitled "A Tunable, Continuous Wave, Thulium-Doped, Solid State Laser", Ser. No. (Navy Case No. 72,123), filed Mar. 30, 1990, both of which applications having the same inventive entity and being commonly assigned to the Government of the United States.

BACKGROUND OF THE INVENTION

1. Field of the Invention

The present invention relates to lasers and particularly to a laser diode-pumped, Q-switched, thulium-doped, solid state laser for producing a pulsed laser emission at a wavelength of substantially 2 microns at or near room temperature.

2. Description of the Prior Art

Development of room temperature solid state lasers in the two micron spectral range has received renewed attention recently because of potential applications in medicine and optical communications. Q-switched 2 micron lasers are of particular importance since they can provide efficient pump lines for tunable parametric oscillators covering the entire 2-12 micron region. Such Q-switched 2 micron lasers also can be readily utilized in various low power, time-controlled medical applications. However, previous Q-switched 2 micron lasers have only been successfully operated with flashpumped excitation systems, which are large and cumbersome.

OBJECTS OF THE INVENTION

Accordingly, one object of the invention is to provide a laser-pumped, Q-switched, 2 micron, solid state laser that operates at room temperature.

Another object of the invention is to provide a laser diode-pumped, Q-switched, 2 micron laser that operates at room temperature.

Another object of the invention is to provide a titanium-sapphire laser-pumped, Q-switched, 2 micron laser that operates at room temperature.

Another object of the invention is to provide a room-temperature, laser-pumped, Q-switched, thulium-doped, solid state laser for producing pulses of laser emission at substantially 2 microns.

Another object of the invention is to provide a room-temperature, laser diode-pumped, Q-switched, thulium-doped, solid state laser for producing a pulsed laser emission at substantially 2 microns.

Another object of the invention is to provide a room-temperature, titanium-sapphire laser-pumped, Q-switched, thulium-doped, solid state laser for producing a pulsed laser emission at substantially 2 microns.

A further object of the invention is to provide a laser-pumped, Q-switched, solid state laser having a host crystal material selected from the group consisting of YAG, YSAG, YSGG, YGG, GGG, GSAG, GSGG, LLGG, YAlO, YLF and mixtures thereof and with the host material being doped with a concentration of $Tm^{3+}$ activator ions sufficient to produce a laser emission at substantially 2 microns.

SUMMARY OF THE INVENTION

These and other objects of the invention are achieved by providing a room-temperature, laser-pumped, Q-switched, thulium-doped, solid state laser for producing pulses of laser emission at substantially 2 microns. The room-temperature solid state laser includes a laser pump for emitting a CW pump beam at a preselected wavelength and a laser crystal disposed in a laser cavity defined by first and second reflective elements opposing each other on a common axis to form a reflective path therebetween. The laser crystal has a host material doped with an amount of thulium activator ions sufficient to produce a laser emission at substantially 2 microns when the laser crystal is enabled and is pumped by the CW pump beam at the preselected wavelength. A Q-switch is disposed in the laser cavity between the laser crystal and the second reflective element for periodically enabling the laser crystal to produce a pulsed laser emission at substantially 2 microns when the laser crystal is also pumped by the CW pump beam at the preselected wavelength.

BRIEF DESCRIPTION OF THE DRAWINGS

These and other objects, features and advantages of the as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

Figure 1:
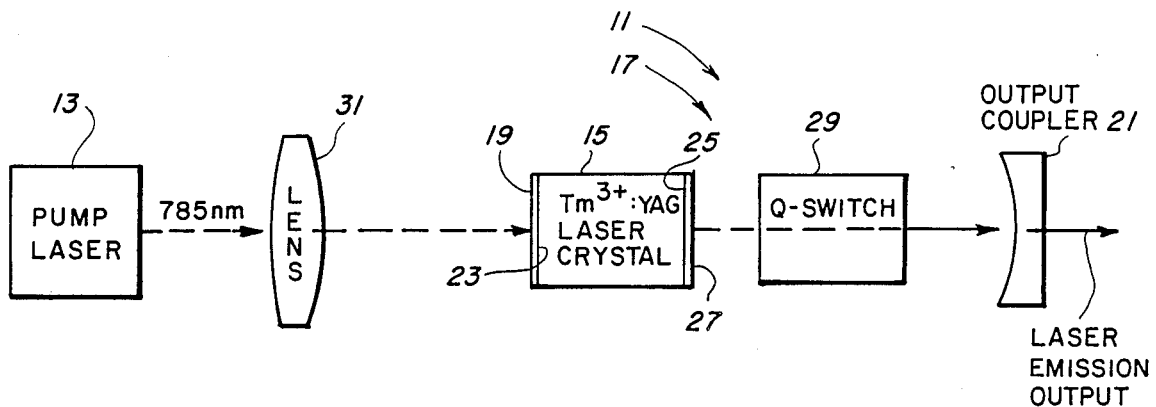
FIG. 1 illustrates a preferred embodiment of the invention.

Referring now to the drawings, FIG. 1 illustrates a preferred embodiment of the invention in which a room-temperature, thulium-doped ($Tm^{3+}$-doped), Q-switched, solid state laser 11 is pumped by a 785 nanometer (nm), continuous wave (CW) laser beam from a pump laser 13 to produce a pulsed laser emission at a wavelength of about 2.02 microns.

Pump laser 13, which emits the CW 785 nm laser beam to pump the laser 11, is preferrably a GaAlAs laser diode array or a GaAlAs laser diode. However, the pump laser 13 can also be a titanium:sapphire laser which also can produce a CW pump beam at a wavelength of 785 nm. It should be noted at this time that the pump wavelength of 785 nm was chosen because 785 nm is the absorption peak of the thulium in the solid state laser 11.

The solid state laser 11 is comprised of a laser rod or crystal 15 disposed in a laser cavity 17 defined by optically-aligned, input and output reflective elements or mirrors 19 and 21. Reflective elements 19 and 21 oppose each other on a common 14 axis to form a reflective path therebetween.

The laser crystal 15, which can have a length between 0.25 mm and 25 mm (millimeters), has an exemplary length in this description of approximately 3 millimeters (mm) and also has flat and parallel surfaces 23 and 25. The input surface 23 of the laser crystal 15 has a dichroic coating which operates as the input reflective element or mirror 19. However, it should be understood that the mirror 19 could be a separate mirror spaced apart from the laser crystal 15. The dichroic coating or mirror 19 has a high transmission (about 76%) at the pump wavelength of 785 nm and a high reflection (about 99%) at a wavelength of about 2.02 microns. The second surface 25 of the laser crystal 15 has an anti-reflection coating 27 at about 2.02 microns.

The output reflective element or mirror 21, which defines the output end of the laser cavity 17, is concave and has an exemplary 10 centimeter (cm) radius of curvature. This output mirror 21 is also highly reflective at about 2.02 microns. However, mirror 21 is approximately 0.5% transmissive at a wavelength of about 2.02 microns. Consequently, mirror 21 operates as an output coupler to output a portion of the laser emission developed by the laser crystal 15 when it is pumped by the 785 nm CW laser emission from the pump laser 13 The output mirror or output coupler 21 can be selected from a variety of different output couplers, with a radius of curvature ranging from 5 cm to 20 cm and an output coupling ranging from a transmission of 0.5% to a transmission of 5.0%.

An acousto-optic Q-switch 29 is also disposed in the laser cavity 17 between the laser crystal 15 and the Output coupler 21 to enable the laser crystal 15 to produce a pulsed laser emission at substantially 2 microns when the laser crystal 15 is also pumped by the CW laser emission from the pump laser 13.

It should be noted at this time that the effective loss due to the transmission of the output mirror or coupler 21 is at least as large as the insertion loss due to the Q-switch 29 in the laser cavity 17 in order to obtain useful performance of the laser 11. This means that the effective inversion or gain of the laser 11 must be large enough to overcome these losses, which in turn places minimum pumping requirements on the 785 nm pump laser In operation, an acoustic wave is produced in the Q-switch 29 by applying an RF (radio frequency) wave (not shown) to a piezoelectric transducer (not shown) mounted to a substrate (not shown) of the Q-switch 29. This acoustic wave creates a diffraction grating in the laser crystal 15 which produces a time-dependent loss in the laser cavity 17 so that the laser crystal 15 can be pumped without lasing. Thus, when the RF wave turns the Q-switch 29 on, the laser 11 is turned off This allows a population inversion to build up in the $Tm^{3+}$ dopant as the laser crystal 15 is being pumped by the pump laser 13. When the RF wave is turned off, the Q-switch 29 is turned off and there is no longer an acoustic diffraction grating in the laser crystal 15. Thus, when the Q-switch 29 is turned off, lasing occurs in the laser cavity 17, with the energy stored in the $Tm^{3+}$ dopant in the laser crystal 15 being rapidly dumped to produce a short high energy pulse of laser emission at a wavelength of 2.02 microns.

An electro-optic Q-switch and an associated polarizer could be substituted for the above-discussed, acousto-optic Q-switch 29. Such an electro-optic Q-switch changes its polarized state relative to its associated polarizer in the laser cavity 17 to provide the time-dependent loss in the laser cavity 17. The 785 nm pump beam from the pump laser 13 is focused into the laser cavity 17 mode by a lens 31 having an exemplary 10 cm focal length.

The laser crystal or rod 15 has a laser host crystal material (not shown) which is selected from the broad group consisting of YAG (yttrium aluminum garnet), YSAG (yttrium scandium aluminum garnet), YSGG (yttrium scandium gallium garnet), YGG (yttrium gallium garnet), GGG (gadolinium gallium garnet), GSAG (gadolinium scandium aluminum garnet), GSGG (gadolinium scandium gallium garnet), LLGG (lanthanum lutetium gallium garnet), YAlO (yttrium aluminum oxygen) and YLF (yttrium lanthanum fluoride). The host crystal material could also be comprised of mixtures or combinations of this broad group of crystal materials. The preferred group of host crystal materials is comprised of YAG, YSAG, YSGG, GSAG, GSGG and mixtures thereof; and the most preferred group of host crystal materials is comprised of YAG, YSGG and mixtures thereof.

The selected host crystal material of the laser crystal or rod 15 is doped with an effective amount of $Tm^{3+}$ (thulium) activator ions. When the laser rod 13 is pumped by the CW laser beam from the pump laser 13 and is also enabled by the Q-switch 29, the laser crystal 15 develops a pulsed laser emission at substantially 2.02 microns. On each pass through the cavity 17 to the output coupler or mirror 21, a portion of this 2.02 micron, pulsed laser emission passes through the partially-transmissive output mirror 21 as the laser emission output, while the remainder of that pulsed laser emission is reflected back and forth between the mirrors 19 and 21. This operation is repeated each time that the Q-switch 29 enables the laser crystal 15 to develop another pulse of 2 micron laser emission.

The chief characteristic or requirement of a selected host crystal material is that it must have the capability of easily accepting the dopant trivalent thulium ions ($Tm^{3+}$). The dopant $Tm^{3+}$ ions must go into the host crystal material without significantly distorting the lattice of the host crystal material so that the quality of the host crystal material remains high.

The $Tm^{3+}$ ions are the activator ions which cause the lasing from the laser crystal 15. The $Tm^{3+}$ concentration must be high enough so that an efficient cross-relaxation process (to be explained), which populates the upper laser level, takes place. The term "effective amount of $Tm^{3+}$ ions" means that the concentration of $Tm^{3+}$ ions in the host crystal material is sufficient to enable a cross-relaxation process to be achieved with close to 100% effectiveness.

The host crystal material can be selected from the above-listed broad group of crystals (YAG, YSAG, YSGG, YGG, GGG, GSAG, GSGG, LLGG, YAlO, and YLF) and be doped with an amount of $Tm^{3+}$ ions between about 0.25% and about 80%. The host crystal material is preferably selected from the preferred group of YAG, YSAG, YSGG, GSAG and GSGG crystals and is doped with a preferred amount of $T^{3+}$ ions between about 5% and about 20%. The host crystal material is most preferably selected from the group of YAG and YSGG crystals and is doped with a most preferred amount of $Tm^{3+}$ ions between about 9% and about 15%.

It should be noted at this time that the concentration of the $Tm^{3+}$ dopant in the host crystal material of the laser crystal 15 is inversely proportional to the length of the laser crystal 15. For example, if the crystal length were 0.25 mm, a high concentration of $Tm^{3+}$ dopant (between about 50% and about 80%) would be used; if the crystal length were 25 mm, a low concentration of Tm$^{3+}$ dopant (about 0.25%) would be used; and for an intermediate crystal length between 0.25 mm and 25 mm, an intermediate concentration of Tm$^{3+}$ dopant would be used. For the exemplary crystal length of 3 mm, an exemplary 12% concentration of Tm$^{3+}$ dopant could be used.

It should be further noted at this time that, by the use of the percentage (%) ranges used in conjunction with the term "amount of Tm$^{3+}$ ions", it is meant the percent of substitution of the Tm$^{3+}$ ions for the yttrium ions in YAG, for the yttrium ions in YSAG, for the yttrium ions in YSGG, for the yttrium ions in YGG, for the gadolinium ions in GGG, for the gadolinium ions in GSAG, for the gadolinium ions in GSGG, for the lanthanum ions in LLGG, for the yttrium ions in YAlO or for the yttrium ions in YLF. For example, an amount of Tm$^{3+}$ ions of 12% in a YAG host crystal material means that the Tm$^{3+}$ ions are substituted for (or replace) 12% of the yttrium ions in the YAG crystal.

It also should be noted that the selected host crystal material is doped with the effective amount of Tm$^{3+}$ ions by applying techniques well known to those skilled in the art and, hence, requires no further description of such techniques.

Figure 2:
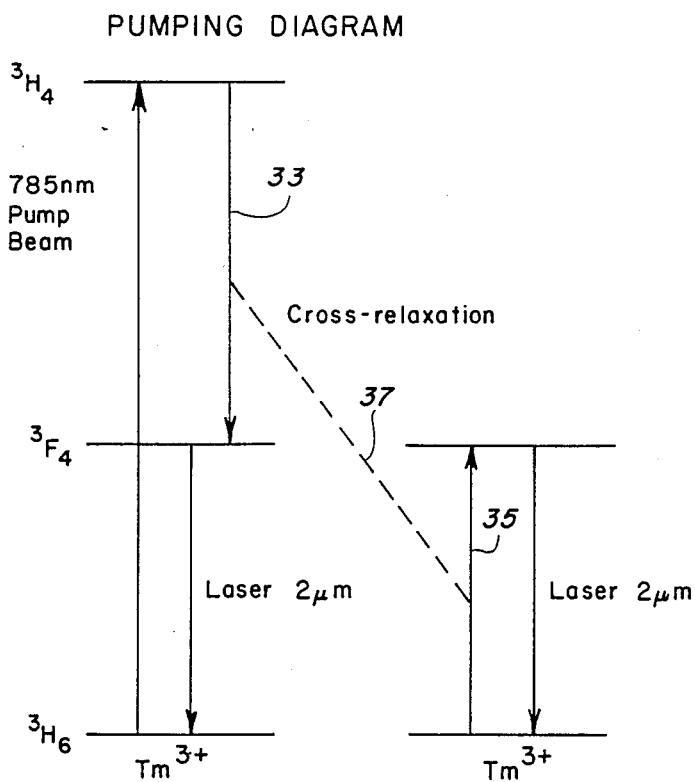
FIG. 2 illustrates the pumping diagram for an exemplary 12% amount of $Tm^{3+}$ activator ions in an exemplary YAG host material.

FIG. 2 illustrates the pumping diagram for an exemplary 12% concentration or amount of Tm$^{3+}$ activator ions (or an ion density of $1.67 \times 10^{21}$ cm$^{-3}$) in an exemplary YAG host material in the laser crystal or rod 15 of FIG. 1. More specifically, FIG. 2 shows some of the various energy levels for the Tm$^{3+}$ ions in the laser crystal 15. As shown, $^3H_4$ is the pump level for the CW 785 nm laser beam from the pump laser 13, $^3F_4$ is the upper laser level or state of the Tm-doped laser crystal 15, and $^3H_6$ is the lower laser level or state of the laser crystal 15.

In operation, the $^3H_4$ level of Tm$^{3+}$ is pumped by the CW pump beam from the pump laser 13 (FIG. 1) at 785 nm, as shown in FIG. 2. The $^3F_4$ upper laser level (of the Tm$^{3+}$-doped laser crystal 15) is populated by a cross-relaxation process (indicated by arrows 33 and 35 connected by a dashed line 37) in which two Tm$^{3+}$ ions, one in the $^3H_4$ pump level and one in the $^3H_6$ ground state, exchange energy. This energy exchange results in two Tm$^{3+}$ ions moving to the $^3F_4$ level. Lasing or photon emission from the laser crystal 15 then occurs at a wavelength around 2.02 microns as the excited Tm$^{3+}$ ions in the $^3F_4$ upper laser level decay to the $^3H_6$ lower laser level.

The above-described cross-relaxation process is a near-resonant nonradiative process in which an excited Tm$^{3+}$ ion in the $^3H_4$ state decays to the $^3F_4$ state and a neighboring ground-state Tm$^{3+}$ ion is promoted to the $^3F_4$ level, accompanied by the emission of photons. The obvious advantage of this cross-relaxation process or operation is that a single Tm$^{3+}$ ion excited to the $^3H_4$ level generates two Tm$^{3+}$ ions in the $^3F_4$ upper laser level. Experiments have shown that the probability of the Tm$^{3+}$ cross-relaxation occurring is small for concentrations of Tm$^{3+}$ ions less than about 2%, but approaches unity for concentrations of Tm$^{3+}$ ions greater than about 5%.

The effectiveness of the above-described cross relaxation process increases as the Tm$^{3+}$ concentration is increased, up to at least a 50% concentration. The doping of the exemplary YAG host material in the laser crystal 15 with the exemplary 12% concentration or amount of Tm$^{3+}$ ensures dominance of the cross-relaxation process over fluorescence from the $^3H_4$ pump level.

The effectiveness of the cross-relaxation pumping process produces a 56% slope efficiency for CW operation of the transition from the upper laser level of $^3F_4$ to the lower laser level of $^3H_6$. This 56% slope efficiency is greater than the theoretical limit of 39% in the absence of the cross-relaxation process.

Figure 3:
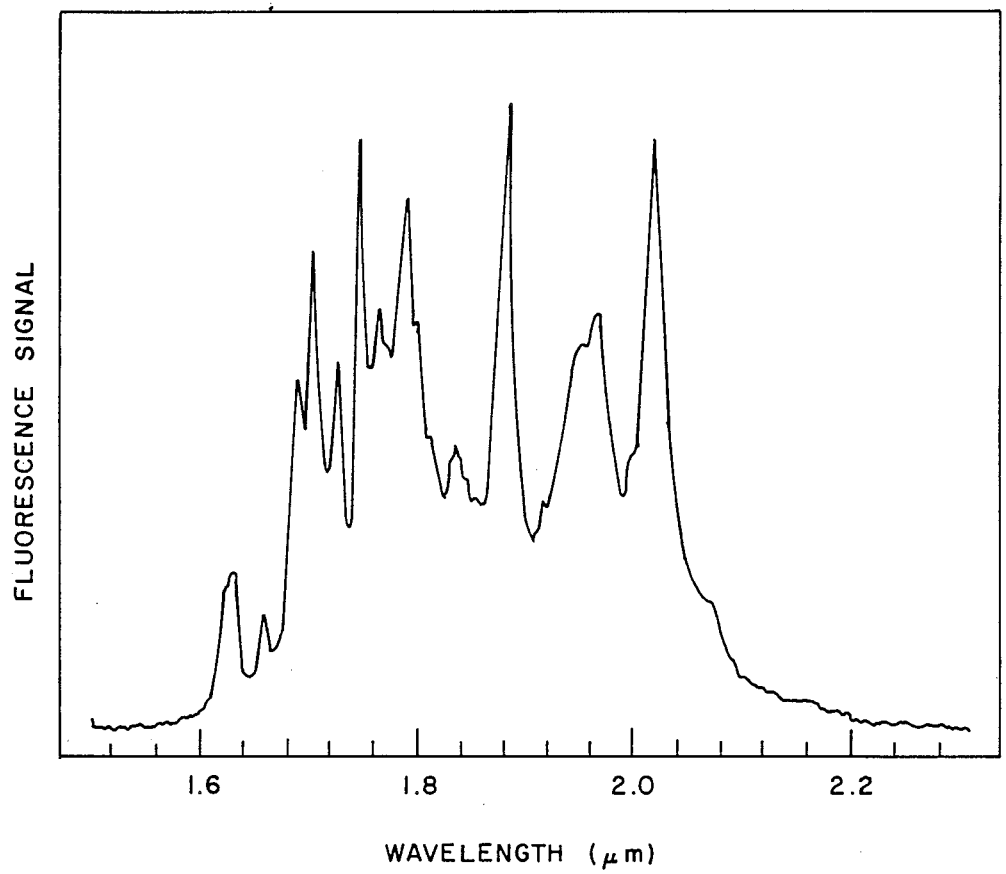
FIG. 3 illustrates the room-temperature fluorescence (emission) spectrum from the $Tm^{3+}$ $^3F_4$ level in a YAG host material.

FIG. 3 illustrates the room-temperature fluorescence (emission) spectrum from the Tm$^{3+}$ $^3F_4$ level in a YAG host material in the laser crystal 15 of FIG. 1. More specifically, the room temperature Tm$^{3+}$:YAG fluorescence spectrum shown in FIG. 3 clearly indicates that a near-maximum peak of the spectral gain distribution occurs when the laser emission from the laser crystal 15 has a wavelength of about 2.02 microns.

Therefore, what has been described in a preferred embodiment of the invention is a room-temperature, laser-pumped, Q-switched, Tm$^{3+}$-doped, solid state laser which is pumped by a 785 nanometer, continuous wave laser beam from a pump laser to produce a pulsed laser emission at a wavelength of about 2.02 microns. The pump laser is preferably a laser diode source, but can also be a titanium-doped sapphire laser.

It should therefore be readily understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A room-temperature solid state laser comprising:
   a laser cavity defined by first and second reflective elements opposing each other on a common axis to form a reflective path therebetween;
   a laser crystal disposed in said laser cavity, said laser crystal having a host material doped with an amount of thulium activator ions sufficient to produce a laser emission at substantially 2 microns from the $^3F_4$ to $^3H_6$ laser transition in said thulium activator ions when said laser crystal is enabled and is pumped by a CW pump beam at a preselected wavelength;
   a pump laser for pumping said laser crystal with said CW pump beam at said preselected wavelength; and
   means disposed in said laser cavity between said laser crystal and said second reflective element for periodically enabling said laser crystal to produce a pulsed laser emission at substantially 2 microns when said laser crystal is also pumped by said CW pump beam.

2. The laser of claim 1 wherein:
   said periodically enabling means is a Q-switch.

3. The laser of claim 2 wherein:
   said Q-switch is an acousto-optic Q-switch.

4. The laser of claim 2 wherein:
   said Q-switch is an electro-optic Q-switch.

5. The laser of claim 1 further including:
   optical means disposed between said pump laser and said laser crystal for matching the CW pump beam to said laser crystal.

6. The laser of claim 1 wherein:
   said host material is selected from the group consisting of YAG, YSAG, YSGG, YGG, GGG, GSAG, GSGG, LLGG, YAlO, YLF and mixtures thereof; and
   said host material is doped with an amount of Tm$^{3+}$ activator ions between 0.25% and 50%.

7. The laser of claim 1 wherein:
said host material is selected from the group consisting of YAG, YSAG, YSGG, GSAG, GSGG and mixtures thereof; and
said host material is doped with an amount of $Tm^{3+}$ activator ions between 5% and 20%.

8. The laser of claim 1 wherein:
said host material is selected from the group consisting of YAG, YSAG, YSGG, GSAG, GSGG and mixtures thereof; and
said host material is doped with an amount of $Tm^{3+}$ activator ions between 9% and 15%.

9. The laser of claim 1 wherein:
said host material is selected from the group consisting of YAG, YSGG and mixtures thereof; and
said host material is doped with an amount of $Tm^{3+}$ ions of substantially 12%.

10. The laser of claim 1 wherein:
said pump laser is comprised of a titanium-sapphire laser for emitting the CW pump beam at a wavelength of approximately 0.785 microns.

11. The laser of claim 1 wherein:
said pump laser is comprised of a laser diode source for emitting the CW pump beam at a wavelength of approximately 0.785 microns.

12. The laser of claim 11 wherein:
said Q-switch is an acousto-optic Q-switch.

13. The laser of claim 11 wherein:
said Q-switch is an electro-optic Q-switch.

14. The laser of claim 1 wherein:
said first reflective element, comprises a dichroic coating on the input surface of said laser crystal, said dichroic coating having a high transmissivity at the pump wavelength of said pump laser and a high reflectivity at substantially 2 microns; and
said second reflective element is an output coupler having a low transmissivity at substantially 2 microns to pass said 2 micron pulses of laser emission.

15. The laser of claim 14 wherein:
said pump laser is selected from the group consisting of a titanium-sapphire laser and a laser diode source to emit the CW pump beam at a wavelength of approximately 0.785 microns.

16. The laser of claim 15 further including:
optical means disposed between said pump laser and said laser crystal for matching the CW pump beam to said laser crystal.

17. The laser of claim 16 wherein:
said host material is selected from the group consisting of YAG, YSAG, YSGG, GSAG, GSGG and mixtures thereof; and
said host material is doped with an amount of $Tm^{3+}$ activator ions between 5% and 20%.

18. The laser of claim 17 wherein:
said Q-switch is selected from the group consisting of an acousto-optic Q-switch and an electro-optic Q-switch.

19. The laser of claim 17 wherein:
said amount of $Tm^{3+}$ activator ions in said host material is inversely proportional to the length of said laser crystal.

20. A method for producing pulses of 2 micron laser emission, said method comprising the steps of:
forming a laser crystal having a host material doped with a concentration of $Tm^{3+}$ activator ions sufficient to produce a laser emission on the $^3F_4$ to $^3H_6$ transition of the $Tm^{3+}$ activator ions when the laser crystal is enabled and is pumped by a CW pump beam at a preselected wavelength;
generating a CW pump beam at the preselected wavelength;
directing the CW pump beam into $Tm^{3+}$-doped host material of the laser crystal to produce a laser emission at substantially 2 microns from the $^3F_4$ to $^3H_6$ laser, transition in the $Tm^{33+}$ activator ions when the laser crystal is also enabled; and
periodically enabling the laser crystal to produce a pulsed laser emission at substantially 2 microns when the laser crystal is also pumped by the CW pump beam at the preselected wavelength.

* * * * *